US011890883B2

(12) United States Patent
Lee et al.

(10) Patent No.: US 11,890,883 B2
(45) Date of Patent: Feb. 6, 2024

(54) THERMAL TRANSFER RIBBON, AND STICKER PRINTING METHOD USING SAME

(71) Applicant: DS GLOBAL, Seoul (KR)

(72) Inventors: Sun Kyun Lee, Seoul (KR); Gu Berm Jung, Seoul (KR); Dong Su Nam, Seoul (KR)

(73) Assignee: DS GLOBAL, Seoul (KR)

( * ) Notice: Subject to any disclaimer, the term of this patent is extended or adjusted under 35 U.S.C. 154(b) by 181 days.

(21) Appl. No.: 17/618,094

(22) PCT Filed: Jun. 10, 2020

(86) PCT No.: PCT/KR2020/007512
§ 371 (c)(1),
(2) Date: Dec. 10, 2021

(87) PCT Pub. No.: WO2020/251256
PCT Pub. Date: Dec. 17, 2020

(65) Prior Publication Data
US 2022/0227152 A1 Jul. 21, 2022

(30) Foreign Application Priority Data
Jun. 13, 2019 (KR) ........................ 10-2019-0070111

(51) Int. Cl.
*B41J 31/08* (2006.01)
*A45D 29/00* (2006.01)
(Continued)

(52) U.S. Cl.
CPC .............. *B41J 31/08* (2013.01); *A45D 29/00* (2013.01); *B41J 2/2107* (2013.01); *B41J 2/33* (2013.01);
(Continued)

(58) Field of Classification Search
CPC ... B41J 31/08; B41J 2/2107; B41J 2/33; B41J 3/407; B41J 31/00; A45D 29/00;
(Continued)

(56) References Cited

U.S. PATENT DOCUMENTS 7,005,166 B2 * 2/2006 Narita .................... B41M 3/144 503/227

FOREIGN PATENT DOCUMENTS

JP 11-129635 A 5/1999
KR 10-0413046 B1 1/2004
(Continued)

OTHER PUBLICATIONS

Kim Hwan GI et al., "Sublimation Type Thermal Transfer Ribbon", Apr. 9, 2010, [Description of Embodiments, Paragraphs 0001-0010] (Year: 2010).*

(Continued)

*Primary Examiner* — Lisa Solomon
(74) *Attorney, Agent, or Firm* — NKL Law; Jae Youn Kim

(57) ABSTRACT

Proposed are a thermal transfer ribbon and a sticker printing method using the same, which can form not only full-color images formed by a color ink part but also points, such as pearl, fluorescent, luminous, sparkling, glass, and metal glitters. The thermal transfer ribbon includes: a color ink part having a yellow ink part (Y), a magenta ink part (M), and a cyan ink part (C); an overlay part forming an overlay layer to protect a printed surface; and at least one point ink part provided between the color ink part and the overlay part.

7 Claims, 2 Drawing Sheets

(51) Int. Cl.

| | |
|---|---|
| ***B41J 2/21*** | (2006.01) |
| ***B41J 2/33*** | (2006.01) |
| ***B41J 3/407*** | (2006.01) |

(52) U.S. Cl.
CPC ......... *B41J 3/407* (2013.01); *A45D 2029/005* (2013.01)

(58) Field of Classification Search
CPC ............ A45D 2029/005; A45D 29/001; A45D 31/00; B41M 5/382; B41M 5/385; B41M 5/40; B41M 5/38214
See application file for complete search history.

(56) References Cited

FOREIGN PATENT DOCUMENTS

| | | | |
|---|---|---|---|
| KR | 10-2004-0011212 | A | 2/2004 |
| KR | 10-2010-0037481 | A | 4/2010 |
| KR | 10-2010-0117536 | A | 11/2010 |
| KR | 10-2015-0050379 | A | 5/2015 |

OTHER PUBLICATIONS

Hui Ting Yang, "Ribbon and Photograph Printing Method", May 8, 2015, [Description of Embodiments] (Year: 2015).*

* cited by examiner

THERMAL TRANSFER RIBBON, AND STICKER PRINTING METHOD USING SAME

TECHNICAL FIELD

The present invention relates to a thermal transfer ribbon and a sticker printing method using the same, and more particularly, to a thermal transfer ribbon and a sticker printing method using the same, which can form not only full-color images formed by a color ink part but also points, such as pearl, fluorescent, luminous, sparkling, glass, and metal glitters.

BACKGROUND ART

As the interest in beauty care increases, people enjoy nail art to make the nails beautiful by applying various patterns or colors to fingernails and toenails. For such nail art, people paint nails with nail polish or attach artificial nails or nail stickers onto the nails.

The nail polish has several inconveniences in that it smells bad, in that a user has to wait till the nail polish dries, and in that the user has to use polish remover, such as acetone, in order to remove the nail polish. Moreover, the artificial nails have a disadvantage in that they may cause skin problems while the user removes adhesives adhered on the rear surfaces of the artificial nails and it is difficult to reuse.

Therefore, recently, nail stickers which are disposable, cheap and conveniently usable have been used widely. Such conventional nail stickers have previously printed patterns and points, such pearl, sparkling, and metal glitters. However, it is difficult for a consumer to find a desired pattern or color, and the conventional nail stickers cannot sufficiently show the user's personality since being ready-made.

Furthermore, the conventional nail stickers have a disadvantage in that the manufacturing process is complicated since glitters with different colors must be printed in order by silk-screening in order to improve decorative features.

In order to solve the disadvantages, nail stickers which allow users to easily and conveniently express ornaments of the surfaces of the stickers using thermal transfer printing have been developed.

FIG. 1 is a schematic diagram illustrating a conventional thermal transfer ribbon of a roll type. As illustrated in FIG. 1, the conventional thermal transfer ribbon is formed in a roll type of which both ends are connected to spools 3*a* and 3*b*, and includes a color ink part 5 having a yellow ink part Y, a magenta ink part M, and a cyan ink part C formed in order so that colors of yellow Y, magenta M and cyan C are transferred to a printing sheet.

Moreover, in order to thermally or mechanically protect the colored layer of the yellow Y, the magenta M and the cyan C transferred to the printing sheet, an overlay part 7 having a laminated overlay layer is formed.

The conventional thermal transfer ribbon can represent the basic colors of yellow Y, magenta M and cyan C in full color, but cannot express splendor and is difficult to meet consumers' various tastes since it cannot form points, such as pearl, sparkling, and metal glitters of the conventional nail stickers.

DISCLOSURE

Technical Problem

Accordingly, the present invention has been made in an effort to solve the above-mentioned problems occurring in the prior arts, and it is an object of the present invention to provide a thermal transfer ribbon which is suitable for printing nail stickers and includes a color ink part, and two or more melted point ink parts capable of representing a metallic material to express clear colors and maximize splendor of pearl, fluorescent, luminous, sparkling, glass or metal glitters.

It is another object of the present invention is to provide a sticker printing method capable of expressing ornaments of the surface of a sticker easily and conveniently using thermal transfer printing.

Technical Solution

To achieve the above objects, the present invention provides a thermal transfer ribbon including: a color ink part having a yellow ink part (Y), a magenta ink part (M), and a cyan ink part (C); an overlay part forming an overlay layer to protect a printed surface; and at least one point ink part provided between the color ink part and the overlay part.

Moreover, the color ink part is formed by sublimation ink, and the point ink part is formed by molten ink.

Furthermore, the point ink part includes at least one of pearl, fluorescent, luminous, sparkling, glass, and metal pigments.

Additionally, in the case that a plurality of point ink parts are formed between the color ink part and the overlay part, the particle size of the point ink part close to the color ink part is larger than that of the point ink part close to the overlay part.

Especially, when a first point ink part P1 and a second point ink part P2 are formed between the color ink part and the overlay part, the particle size of the pigment included in the first point ink part P1 is 9 to 29 μm, and the particle size of the pigment included in the second point ink part P2 is 4 to 24 μm.

In addition, the point ink part includes a binder resin, and the binder resin has glass transition temperature (Tg) of 80° C. or lower and molecular weight (Mw) of 100,000 g/mol or less.

Moreover, the thermal transfer ribbon includes: a substrate layer having one side on which the color ink part, the overlay part, and the point ink part are coated; and a heat-resistant layer coated on the rear side of the substrate layer, wherein the thickness of the substrate layer is 4.0 μm to 6.0 μm, the thickness of the heat-resistant layer is 0.1 μm to 2 μm, and the thickness of the color ink part or the point ink part is 0.3 μm to 15 μm.

In another aspect of the present invention, there is provided a sticker printing method using the thermal transfer ribbon according to the present invention includes steps of: 1) forming an image on a printing sheet in a state in which a yellow ink part (Y) is positioned on the lower part of a thermal transfer head; 2) forming an image on the printing sheet in a state in which a magenta ink part (M) is positioned on the lower part of the thermal transfer head; 3) forming an image on the printing sheet in a state in which a cyan ink part (C) is positioned on the lower part of the thermal transfer head; 4) forming a point on the printing sheet in a state in which a point ink part is positioned on the lower part of the thermal transfer head; and 5) forming an overlay layer on a printed surface of the printing sheet in a state in which an overlay part is positioned on the lower part of the thermal transfer head.

Additionally, the steps 1) to 3) are to form an image with sublimation ink, and the step 4) is to form a point with molten ink.

In addition, the point the point includes at least one of pearl, fluorescent, luminous, sparkling, glass, and metal.

Advantageous Effects

The thermal transfer ribbon according to an embodiment of the present invention can print stickers for nail decoration since forming clear and full color images and maximizing splendor of pearl, fluorescent, luminous, sparkling, glass or metal glitters.

Additionally, the sticker printing method according to an embodiment of the present invention can express ornaments of the surface of a sticker easily and conveniently using thermal transfer printing.

BEST MODE

The inventors of the present invention have made efforts to apply a polyurethane substrate to an image receiving sheet for a sublimation photo printer and to develop a thermal transfer ribbon capable of forming points of a metallic material to be suitable for a printing sheet for nail decoration. As a result, in the case that at least one point ink part is disposed between a color ink part and an overlay part, the inventors could find out that fancy points, such as pearl, fluorescent, luminous, sparkling, glass or metal glitters, on the printing sheet for nail decoration, and perfected the present invention based on the above.

Hereinafter, a thermal transfer ribbon, a sticker printing method using the same, and especially, a sticker for nail decoration will be described in detail.

Figure 1:
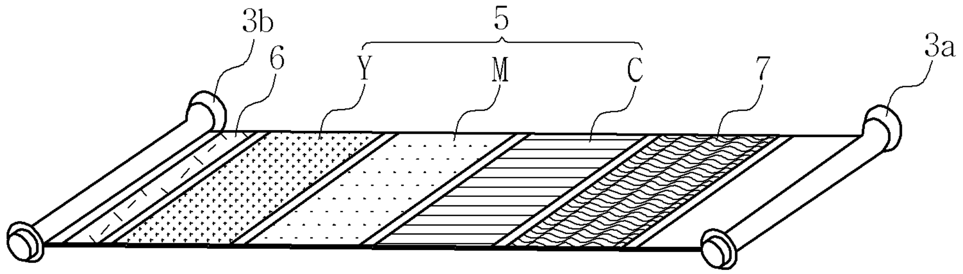
FIG. 1 is a schematic diagram illustrating a conventional ribbon of a roll type.
Figure 2:
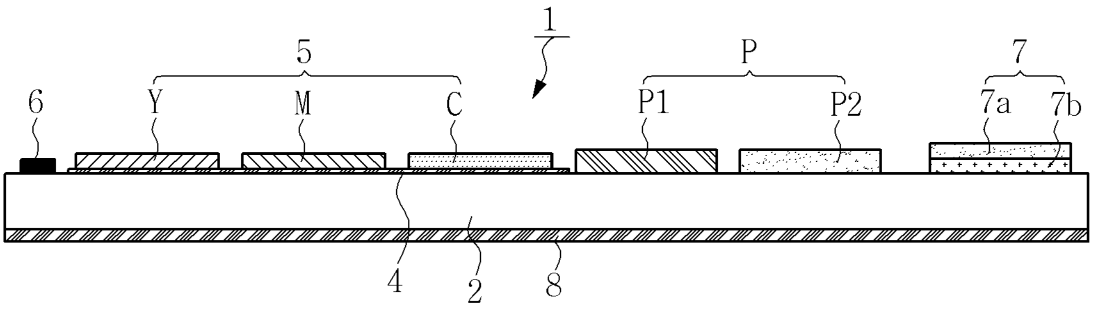
FIG. 2 is a schematic side view of a thermal transfer ribbon according to an embodiment of the present invention.
Figure 3:
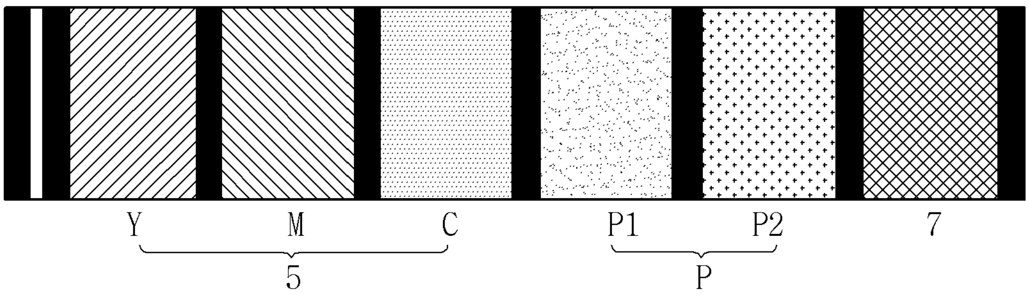
FIG. 3 is a schematic plan view of the thermal transfer ribbon according to the embodiment of the present invention.

FIG. 2 is a schematic side view of a thermal transfer ribbon according to an embodiment of the present invention, and FIG. 3 is a schematic plan view of the thermal transfer ribbon according to the embodiment of the present invention.

A thermal transfer ribbon 1 according to an embodiment of the present invention includes: a substrate layer 2; a color ink part 5, an overlay part 7, and a point ink part P applied to one side of the substrate layer 2; and a heat-resistant layer 8 applied to the rear side of the substrate layer 2.

In detail, a yellow ink part Y, a magenta ink part M, a cyan ink part C, a point ink part P, and an overlay part 7 are applied on one side of the substrate layer 2 in order.

In this embodiment, the point ink part P includes a first point ink part P1 and a second point ink part P2.

Substrate Layer

The substrate layer 2 included in the thermal transfer ribbon according to the present invention is a layer for supporting the thermal transfer ribbon, can transfer heat to the color ink part and the point ink part, and is made of a material with sufficient mechanical stability.

The substrate layer 2 is at least one material selected from the group consisting of polyester, such as polyethylene terephthalate, polybutylene terephthalate, and polyethylene naphthalate, polyacrylate, polycarbonate, cellulose ester, and polyimide in consideration of thermal resistance and intensity of a thermal transfer film. In an aspect of mechanical stability and thermal transfer, it is preferable to use polyethylene terephthalate.

The substrate layer is generally 0.5 μm to 50 μm thick, but is preferably 4 μm to 6 μm thick in order to effectively perform the role of the substrate layer for thermal transfer.

In the case of the substrate layer, preferably, substrate intensity, which is expressed at a ratio [S1/S2] of break strength S1 (MPa) and elongation-at-break S2 (PMa) measured by JIS C2151 in relation to a longitudinal direction, ranges from 2.5 to 5.0, and more preferably, from 3.0 to less than 4.0.

Moreover, in the case of the substrate layer, preferably, thermal contraction (%) measured by JIS C2151 in relation to the longitudinal direction at 150° C. for 30 minutes is up to 5.0, preferably, up to 2.5%, and more preferably, ranges from 0.5% to 2.5%.

Heat-Resistant Layer

The heat-resistant layer 8 is to prevent the substrate layer from being melted by thermal energy emitted from a thermal transfer printer, and is applied to the rear surface of the substrate layer.

Preferably, the heat-resistant layer includes a binder with high glass transition temperature and a lubricant. The binder is, for instance, polyvinyl acetoacetal, or polyester, and the lubricant may be silicon oil.

More preferably, the heat-resistant layer is formed of a composition consisting of polyvinyl acetoacetal resin, polyester resin, amino-modified silicon oil, and solvent.

The binder resin ranges from 70% by weight to 99.9% by weight based on 100% by weight of total ingredients of the heat-resistant layer.

For instance, in the case that polyvinyl acetoacetal resin and polyester resin are mixed, a ratio of polyvinyl acetoacetal resin to polyester resin ranges from 10:1 to 4:1.

Moreover, it is preferable that the amino-modified silicon oil range from 0.01% by weight to 10% by weight based on 100% by weight of total ingredients of the heat-resistant layer.

The solvent used for the composition to coat the heat-resistant layer may be mixture of ketone, toluene, ether, alcohol, hydrocarbon, and others, and preferably, is mixture of methylethyleketone and toluene.

In this instance, it is preferable to use the solvent so that a solid of the composition of the heat-resistant layer ranges from 5% to 15%.

Preferably, the heat-resistant layer ranges from 0.1 μm to 2 μm in thickness in order to effectively prevent the thermal transfer ribbon from being fused on a heating element.

Ink

Ink is divided into sublimation ink and melted ink depending on properties of the ink. The sublimation ink has been widely used since being capable of adjusting an amount of dye transferred in proportion to thermal energy applied by a thermal device of the thermal transfer printer so that only a sublimation dye is transferred to a receiving layer in proportion to thermal energy applied by the thermal device of the thermal transfer printer.

The sublimation ink is good at forming full color images through mixing of yellow color Y, magenta color M, and cyan color C, but is not enough to express fanciness of pearl, fluorescent, luminous, sparkling, glass, and metal glitters. For instance, when a nail sticker is printed, the sublimation ink can print background colors or images with various colors, but is not enough to express twinkling pearls, or silver or gold color with metallic gloss on the background color.

In order to solve the above problem, the color ink parts 5, namely, the yellow ink part Y, the magenta ink part M, and the cyan ink part C further include point ink parts P having melted ink.

That is, the point ink parts P are disposed between the color ink part 5 and the overlay part 7 and have melted ink. One or more point ink parts P may be disposed between the color ink part 5 and the overlay part 7. In this embodiment, two point ink parts, such as a first point ink part P1 and a second point ink part P2, are disposed. The first point ink part forms points with gloss silver color to which gold pearls are mixed, and the second point ink part forms points with gloss gold color to which silver pearls are mixed.

Color Ink Part

The color ink part 5 includes sublimation dyes of three colors, namely, yellow, magenta, and cyan, and may further include sublimation ink of different colors according to the user's selection.

The color ink part 5 is formed by applying sublimation dyes, which have predetermined colors to be transferred to a printing sheet, onto one side of the substrate layer to be divided according to the colors. The color ink part 5 is formed of composition including, for instance, a sublimation dye, a binder, and a solvent, and the composition may further include various additives, such as an antioxidant, an ultraviolet absorber, and a dye crystallization inhibitor, which are used commonly, according to purposes of use.

The composition for forming the color ink part 5 includes 1 to 10 wt % of the sublimation dye, 1 to 10 wt % of the binder, and 80 to 95 wt % of the solvent, and has excellent resolution and transfer properties.

The sublimation dye is not particularly limited, but has sufficient coloring concentration, and preferably, is not discolored by light, heat, temperature, and others.

The sublimation dye includes: a diarylmethane-based dye; a triarylmethane-based dye; a thiazole-based dye; a merocyanine dye; a pyrazolone dye; a methine-based dye; an Indian aniline dye; an azomethine-based dye, such as acetophenone azomethine, pyrazolo azomethine, imidazole azomethine, imidazoazomethine, and pyridone azomethine, and the like; xanthene-based dye; a jade photographic-based dye; a cyanostyrene-based dye, such as dicyanostyrene and tricyanostyrene; a thiazine-based dye; an azine-based dye; an acridine-based dye; a benzene azo-based dye; an azo-based dye, such as pyridone azo, thiophene azo, isothiazole azo, pyrrole azo, phthalazo, imidazoazo, thiadiazoazo, triazolazo and disazo; a spiropyran-based dye; an indolinopyrapyran-based dye; a fluororan-based dye; a rhodamine lactam-based dye; a naphthoquinone-based dye; an anthraquinone-based dye; a quinophthalone-based dye; and the likes.

More specifically, the yellow-colored sublimation dye uses Kayaset Yellow A-G, Kayaset Yellow GN, Foron Brilliant Yellow 6GL, Waxoline Yellow GFW, and the like. The magenta-colored sublimation dye uses Macrolex Red Violet R, MS Magenta HBM-1450, MS Magenta VP, MS Red G, Kayaset Red 130, and the like. The cyan-colored sublimation dye uses Kayaset Blue 714, Waxoline Blue AP-FW, MS Cyan HM-1238, and the like.

Finally, the sublimation dye of the thermal transfer black color may use mixture of the yellow-colored sublimation dye, the magenta-colored sublimation dye, and the cyan-colored sublimation dye, or use Kayaset Black 922, and the like.

The binder is not limited specifically, but use, for example: cellulose-based resins, such as methyl cellulose, ethyl cellulose, hydroxyethylcellulose, ethylhydroxyethylcellulose, hydroxypropylcellulose, cellulose acetate, cellulose butyrate, and the like; vinyl-based resins, such as polyvinyl acetal including polyvinyl alcohol, polyvinyl acetate, polyvinyl butyral, polyvinylformal, and the like, polyvinylpyrrolidone, polyacrylamide, and the like; polyester-based resins; phenoxy resins; and the like. Preferably, the present invention uses a hydroxyl group, a carboxyl group, such as a polyvinyl butyral, a polyvinyl acetal, a polyvinyl acetate, a polyester-based resin, a cellulose-based resin, and the like, which are excellent at adhesive property even under high-temperature and high-humidity conditions, and more preferably, uses polyvinyl butyral, and polyvinylformal in consideration of adhesive force between the substrate layer and pigments, and transfer strength of applied energy.

In addition, a silane coupling agent may be further added to the binder. In this case, adhesion between layers in contact with the dye layer is improved. The silane coupling agent may be one or more selected from the group consisting of: an isocyanate group-containing compound, such as γ-isocyanate propyltrimethoxy silane, γ-isocyanate propyltriethoxysilane, and the like; an amino group-containing compound, such as γ-aminopropyltrimethoxysilane, γ-aminopropyltriethoxysilane, N-p-aminoethyl-γ-aminopropyltriethoxysilane, γ-phenylaminopropyltrimethoxysilane, and the like; and an epoxy group-containing compound, such as γ-glycidoxypropyltrimethoxysilane, β-(3,4-epoxycyclohexyl) ethyltrimethoxysilane, and the like.

The solvent can be selected from the group consisting of N,N-dimethylformamide, alcohol, glycol ether, ketone, toluene, dimethylformaldehyde, ethyl acetate, methylethylketone, and mixtures thereof, and preferably, is mixture of N,N-dimethylformamide, methyl ethyl ketone, and toluene. In this case, the weight ratio of N,N-dimethylformamide:methylethylketone:toluene is 0.8 to 1.2:0.8 to 1.2:1.8 to 2.2.

Various additives, such as inorganic particles, organic particles, and the like, may be added. The inorganic particles include carbon black, aluminum, molybdenum disulfide, and the like.

The color ink part 5 is formed in the steps of adding the dye, the binder, and the additives, which are selective, to the solvent, dissolving or dispersing the ingredients properly to prepare a dye layer coating solution, coating the dye layer coating solution on the substrate, and drying it.

As a method for coating the sublimation dye, there are a gravure printing method, a screen printing method, a reverse roll coating method using a gravure plate, etc. However, the gravure coating is preferable.

The coating amount of the color ink part is preferably 0.2 to 6.0 $g/m^2$, more preferably, 0.3 to 3.0 $g/m^2$.

Point Ink Part

The present invention further includes a point ink part P as well as the color ink part 5, thereby improving decorative properties by expressing fancy points of pearl, metallic glitters, and the likes, using an easy and simple method.

The point ink part P of the present invention may further include a third point ink part, a fourth point ink part, and the likes, as occasion demands, in addition to the first point ink part P1 and the second point ink part P2.

The point ink part P is transferred to the upper part of the receiving layer on which an image is formed by the color ink part 5, so as to form fancy points, such as pearl, fluorescent, luminous, sparkling, glass, and metal glitters, on the printing sheet.

Therefore, in the case of the printing sheet for nail decoration manufactured using the thermal transfer ribbon according to the present invention, images are located on the dye receiving layer by the sublimation ink transferred from the color ink part so as to express metallic images of various colors.

The point ink part is formed in the steps of melting, coating the metal thin layer coating solution, which has been prepared by dissolving a binder resin in a proper solvent and dispersing metallic pigments, on one side of a substrate film, and drying the substrate film.

The point ink part P preferably uses metal, such as silver, aluminum, copper or gold, jade, fluorescent, luminous, glass, etc., and more preferably, aluminum or copper in the metal in consideration of economic feasibility.

The particle size of the pigment included in the first point ink part (P1) is larger than that of the pigment included in the second point ink part P2.

The first point ink part P1 is a point ink part, which is the closest to the color ink part, among the molten inks included in the point ink part. If the particle size of the pigment included in the first point ink part P1 is larger than that of the pigment included in the second point ink part P2 successively adjacent to the color ink part, the printed matter can have a clear and fancy metal pearl sense.

In contrast, if the pigment particle size of the second point ink part P2 is larger than that of the first point ink part P1, the pigment of the first point ink part P1 printed first may be hidden by the pigment of the second point ink part P2.

Moreover, if the point ink part further includes point ink parts in addition to the first point ink part and the second point ink part, it is desirable to arrange the point ink parts in the order adjacent to the color ink part according to sizes of the pigment particle included in the point ink part.

For example, if the first point ink part, the second point ink part, the third point ink part, and the fourth point ink part are arranged in the order adjacent to the color ink part, the pigment particle size of the first point ink part is the largest, and the pigment particle sizes are sequentially reduced in the order of the second point ink part, the third point ink part, and the fourth point ink part.

The average particle size of the pigment included in the first point ink part P1 is 9 to 29 μm, and the particle size of the pigment included in the second point ink part P2 is 4 to 24 μm. In this case, color characteristics, stability, and dispersibility which are suitable for imparting decorative properties can be shown.

The pigment particle size of the present invention can be measured by a method performed by a person skilled in the art, and for example, can be measured by a transmission electron microscope.

The binder resin included in the point ink part may be, for example, ethylene-vinyl acetate copolymer, ethylene-acrylic acid ester copolymer, polyethylene, polystyrene, polypropylene, polybutene, petroleum resin, vinyl chloride resin, vinyl chloride-vinyl acetate copolymer, polyvinyl alcohol, vinylidene chloride resin, acrylic resin, methacryl resin, polyamide, polycarbonate, fluorine resin, polyvinylformal, polyvinyl butyral, acetyl cellulose, nitrocellulose, polyvinyl acetate, polyisobutylene, ethylcellulose, or polyacetal. Especially, in consideration of dispersibility, adhesion, and transferability, it is preferable to use acrylic resin, methacryl resin, or vinyl chloride-vinyl acetate copolymer.

The binder contained in the point ink part of the present invention, for example, has a glass transition temperature (Tg) of not more than 80° C. More preferably, the glass transition temperature is 75° C. or less, or in the range from 40° C. to 75° C. in terms of dispersibility and adhesion.

Furthermore, the weight average molecular weight (Mw) of the binder can be 100,000 g/mol or less, preferably less than or equal to 80,000 g/mol, in the range from 20,000 g/mol to 80,000 g/mol. In this case, the binder has excellent dispersibility and transferability.

The solvent included in the point ink part can be selected from the group consisting of N,N-dimethylformamide, alcohol, glycol ether, ketone, toluene, dimethylformaldehyde, ethyl acetate, methylethylketone, and mixtures thereof, but preferably, mixture of methyl ethyl ketone and toluene. In this case, the weight ratio of methyl ethyl ketone to toluene is 0.8 to 1.2:0.8 to 1.2.

Additionally, in order to improve adhesion of the pigment layer, melted ink includes microcrystalline wax, carnauba wax, paraffin wax, and the like. In addition, the melted ink may include wax ingredients, such as Fischer-Tropsch wax, various low-molecular weight polyethylene, beeswax, shellac wax, candelilla wax, petrolatum, polyester wax, some modified wax, fatty acid ester, fatty acid amide, and the like. Especially, the melted ink uses, preferably, paraffin wax, low-molecular weight polyethylene, and the like can be used when considering dispersibility, adhesion, heat resistance, and the like.

Before the printing sheet, the overlay part 7 forms an overlay layer to protect the transferred ink from thermal or mechanical stress. The overlay part 7 can be provided at a position adjacent to the point ink part.

The overlay part 7 is not specifically limited if it is the material used in the relevant fields, but acrylic resin has been widely used as the overlay part 7. For example, the overlay part 7 may be formed of a composition including acrylic resin, wax, and solvent. In addition, the overlay part 7 is suitable for manufacturing a nail decoration sheet since having excellent releasability as well as excellent durability.

The overlay part 7, preferably, has a thickness of 0.5 μm to 2 μm. The overlay part 7 may be divided into an upper protective layer 7*a* containing acrylic resin and wax, and a lower protective layer 7*b* containing acrylic resin and not containing wax.

More specifically, the acrylic resin of the overlay part 7 may be methyl methacrylate-butyl methacrylate copolymer (PALALOID B-66 B, B-60 et al.), polymethylmethacrylate (DIANAL BR-83), and the like.

The acrylic resin has an average molecular weight of 10,000 g/mol to 100,000 g/mol, and a glass transition temperature (Tg) of 50° C. to 110° C. If the molecular weight of the acrylic resin is too high, the acrylic resin lacks transferability, and if the molecular weight of the acrylic resin is low, the acrylic resin is not durable. Moreover, if the glass transition temperature is too low, the acrylic resin is not durable, and if the glass transition temperature is high, the acrylic resin lacks releasability.

The average molecular weight of the present disclosure can be measured, for example, by a polystyrene conversion molecular weight analyzed by gel permeation chromatography (GPC).

The glass transition temperature of the present disclosure can be measured using differential scanning calorimetry (DSC).

Furthermore, if the overlay part 7 includes wax, it is preferable to use polytetrafluoroethylene-based wax in consideration of durability and releasability of the overlay part.

The thermal transfer ribbon according to the present invention includes a color identification unit 6 which identifies colors of the ink parts. The color identification part is formed in front of each ink part in the advance direction of the ribbon during printing, and is used to determine the colors of the ink parts with a sufficient width to be sensed by the sensor. The color identification part typically has a black color point or a bar shape. In addition, a starting mark or an end mark of a black band shape is formed at the beginning or the end of the thermal transfer ribbon.

Additionally, the color ink part or the point ink part of the present invention may further include inorganic particles, organic particles, and releasing agents.

The inorganic particles may be, for example, talc, carbon black, aluminum, molybdenum disulfide, and the like, and the organic particles may be, for example, polyethylene wax, silicon resin particulate, and the like.

In addition, the releasing agents may be silicone oil, phosphoric acid ester, fluorine-based material, and the like.

The thermal transfer ribbon of the present invention is characterized in that the thickness of the substrate layer is 4.0 μm to 6.0 μm; the thickness of the heat-resistant layer is 0.1 μm to 2 μm; and the thickness of the color ink part or the point ink part is 0.3 μm to 15 μm.

In detail, the thickness of the substrate layer of the thermal transfer ribbon is 4.0 μm to 6.0 μm, the thickness of the heat-resistant layer is 0.1 μm to 2 μm, the thickness of the color ink part is 0.3 μm to 3 μm, and the thickness of the point ink part is in the range of 2 μm to 15 μm.

In the present disclosure, the thickness of the substrate may be derived from a value obtained by measuring the thickness of the substrate in which ten sheets are superimposed by micrometer (MFC-191, manufactured by Nikon).

MODE FOR INVENTION

Primer Layer

The thermal transfer ribbon of the present invention forms a primer layer between the substrate layer and the color ink part in order to improve the adhesion between the substrate layer and the color ink part. In addition, the primer layer is made of a material having a low dyeing property so as to improve printing density, compared with the case that there is no primer layer.

The resin forming the primer layer may be, for example, a polyester-based resin, a polyvinylpyrrolidone resin, a polyvinyl alcohol resin, hydroxyethylcellulose, a polyacrylic acid ester-based resin, a polyvinyl acetate-based resin, a polyurethane-based resin, a styreneacrylate-based resin, a polyacrylamide-based resin, a polyamide-based resin, a polyether-based resin, a polystyrene-based resin, a polyethylene-based resin, a polypropylene-based resin, a polyvinyl chloride resin, a vinyl chloride-vinyl acetate copolymer, or a polyvinyl acetal-based resin, such as polyvinyl acetal, or a polyvinyl butyral. It is preferable to use the vinyl chloride-vinyl acetate copolymer in consideration of adhesion between the substrate layer and the color ink part.

In another example, the dye primer layer may be formed of inorganic colloidal pigment ultrafine particles. when an image is formed, it is prevented that the sublimation dye is transferred from each dye layer to the dye primer layer. Accordingly, dye diffusion to the receiving layer of the thermal transfer image receiving sheet can be effectively performed, thereby forming an image with high printing density.

The inorganic colloidal pigment ultrafine particle may be one of known compounds. For instance, the inorganic colloidal pigment ultrafine particle is at least one selected from silica (colloidal silica), alumina or alumina hydrate (alumina sol, colloidal alumina, cationic aluminum oxide or hydrate thereof, pseudo-boehmite, etc.), aluminum silicate, magnesium silicate, magnesium carbonate, magnesium oxide, titanium oxide, and the like. Particularly, colloidal silica, and alumina sol is preferably used. The inorganic colloidal pigment ultrafine particle is 100 nm or less in primary average particle diameter, preferably, 50 nm or less.

For example, the primer layer includes a coating solution made of parachlorophenol, and a solvent made of toluene and methylethylketone. Furthermore, a vinyl chloride-vinyl acetate copolymer, which is one of the binders, is added to parachlorophenol.

According to another embodiment of the present invention, the primer layer may be formed such that a coating solution in which the inorganic colloidal pigment ultrafine particles are dissolved or dispersed in a suitable solvent are coated and dried by known forming means, such as gravure coating, roll coat, screen printing, and reverse roll coating using a gravure plate. An amount of the coating solution for the dye primer layer is preferably in the range of 0.02 g/m$^2$ to 1.0 g/m$^2$.

The thermal transfer ribbon of the present invention is used to be printed on the image receiving sheet made of a polyurethane substrate.

In addition, the present invention provides a printing sheet for nail decoration, which has an image receiving sheet, an adhesive layer formed on one side of the image receiving sheet, and a releasable layer. The image receiving sheet is made of a polyurethane substrate. An image is printed on the ink receiving layer of the other side of the image receiving sheet by an output device (printer) using the thermal transfer ribbon according to the present invention.

The conventional image receiving sheet for a thermal transfer photo printer is printing paper or in the form of a general sticker. The substrate which is coated with the ink receiving layer mainly uses polyester, polyacrylate, acrylic, polypropylene, or a synthetic resin thereof. However, the resin is difficult to be transformed according to the curve of the fingernail and is easily broken. In order to solve the problem, the image receiving sheet is formed of polyurethane resin so as to be easily transformed according to the curve of the fingernail and not to be broken easily.

The thickness of polyurethane, which is the substrate layer of the image receiving sheet, is preferably 50 microns to 200 microns. Here, if the image receiving sheet is less than 50 microns, because the sheet is too thin, it is difficult to cope with the curve of the fingernail or the toenail or it is difficult to express the merits of polyurethane. If the substrate layer is more than 200 microns, because the sheet is too thick, flexibility or ductility is not good.

Since heat is applied to the ink receiving layer during thermal transfer, it is preferable that the ink receiving layer have mechanical strength as strong as a user can handle it well even in a heated state.

The thermal transfer ribbon according to the present invention provides a film including, for example, polyester, polyacrylate, polycarbonate, polyimide, polyetherimide, cellulose derivative, polyethylene, ethylene-vinyl acetate copolymer, polypropylene, polystyrene, acryl, polyvinyl chloride, vinyl chloride-vinyl acetate copolymer, polyvinylidene chloride, polyvinyl alcohol, polyvinyl butyral, nylon, polyetheretherketone, polysulfone, polyethersulfone, tetrafluoroethylene-perfluoroalkylvinylether, polyvinylfluoride, tetrafluoroethylene-ethylene, tetrafluoroethylene-hexafluoropropylene, polychlorotrifluoroethylene, polyvinylidene fluoride, and the like. It is preferable to use polyester and vinyl chloride-vinyl acetate copolymer in view of thermal resistance and printability by transfer of the ink ribbon.

Moreover, the adhesive layer is a layer formed on the bottom surface of the image receiving sheet, and the release layer is detachably attached to the bottom surface of the adhesive layer.

The adhesive layer includes, for example, a Pressure sensitive adhesive (PSA), a vinyl monomer-based polymerizable adhesive, an acrylic-based adhesive, or a polyurethane-based adhesive.

The release layer can be easily separated from the adhesive layer, and is one or more selected from polyethylene terephthalate terephthalate (PET), PP, PE, and nylon.

According to the present invention, when the sticker is attached to a nail or a toenail after a release layer is separated, the sticker is adhered on the fingernail or the toenail through an adhesive of the adhesive layer so as to decorate the fingernail or the toenail.

As an example, the output device may be the existing thermal transfer photo printer.

Furthermore, the nail decoration sheet of the present invention may be in the form of Tomson cutting.

In detail, the printing sheet for nail decoration according to the present invention is formed by cutting the nail decoration sheet into a desired shape using a Tomson press machine, The Tomson cutting minimizes damages, such as breakage and deformation, of the surface of the sheet, and provides precision.

The printing sheet for nail decoration according to the present invention can be used without limitation by being attached to the body, such as fingernails, toenails, and the like.

While preferred embodiments of the present invention are presented in order to facilitate the understanding of the present invention, it will be apparent to those skilled in the art that various changes and modifications are possible within the scope and spirit of the present invention, and such modifications and variations are intended to be included within the scope of the appended claims.

EMBODIMENTS

Embodiments 1 to 5 & Comparative Examples 1 to 5

A polyethylene terephthalate film (product name: FC-531) which is 5.7 μm thick has one side which is heat-resistant and the other side which is not heat-resistant. An adhesive layer composition of the following [Table 1] was coated on the side, which was not heat-resistant, to be 0.5 μm thick using a bar coater after drying, thereby manufacturing an adhesive layer of an ink ribbon. Ink layer compositions presented in [Table 2] to [Table 4] were coated on the manufactured adhesive layer of the thermal transfer ribbon in order of the arrangement (Y-M-C) to form a color ink layer of the thermal transfer ribbon.

After that, the first point ink part P1, the second point ink part P2, and the overlay part 7 were manufactured using the compositions of [Table 5] and [Table 6], and then, were arranged in order of the first point ink part P1, the second point ink part P2, and the overlay part 7 so as to manufacture the final thermal transfer ribbon.

TABLE 1

| DIVISION | Adhesive layer composition | INPUT AMOUNT |
|---|---|---|
| SOLUTE | Para-chlorophenol | 3.0 wt % |
| SOLVENT | Methyl ethyl ketone | 7.0 wt % |
| | Toluene | 90.0 wt % |

TABLE 2

| DIVISION | Yellow (sublimation) ink part(Y) composition | Input amount |
|---|---|---|
| BINDER | Polyvinyl butyral (Japanese red chemicals, BX1) | 7.0 wt % |
| SUBLIMATION DYE | Yellow dyes (British ICI, Waxoline Yellow GFW) | 5.0 wt % |
| SOLVENT | N,N-dimethylformamide | 21.5 wt % |
| | Methyl ethyl keton | 21.5 wt % |
| | Toluene | 45.0 wt % |

TABLE 3

| DIVISION | Magenta (sublimation) ink part(M) composition | Input amount |
|---|---|---|
| BINDER | Polyvinyl butyral (Japanese red chemicals, BX1) | 7.0 wt % |
| SUBLIMATION DYE | Magenta dyes (Japanese Miorientia Tsutsugami, Magenta VP) | 5.0 wt % |
| SOLVENT | N,N-dimethylformamide | 21.5 wt % |
| | Methyl ethyl keton | 21.5 wt % |
| | Toluene | 45.0 wt % |

TABLE 4

| DIVISION | Cyan (sublimation) ink part(C) composition | Input amount |
|---|---|---|
| BINDER | Polyvinyl butyral (Japanese red chemicals, BX1) | 7.0 wt % |
| SUBLIMATION DYE | Cyan dyes (Japanese Patent Chemicals, Kayaset, Blue 714) | 5.0 wt % |
| SOLVENT | N,N-dimethylformamide | 21.5 wt % |
| | Methyl ethyl keton | 21.5 wt % |
| | Toluene | 45.0 wt % |

TABLE 5

| | | THERMAL TRANSFER RIBBON (UNIT: WT %) | | | | |
|---|---|---|---|---|---|---|
| LAYER DIVISION | COMPOSITION | EXAMPLE 1 | EXAMPLE 2 | EXAMPLE 3 | EXAMPLE 4 | EXAMPLE 5 |
| P1 | B-66 | 20 | 20 | 20 | 20 | — |
| | B-60 | — | — | — | — | 20 |
| | Aluminum (SDF 6-2031) | 20 | — | — | — | 20 |
| | Copper(Lack G 900) | — | 20 | — | — | — |
| | Glass(LUXAN | — | — | 20 | 20 | — |

TABLE 5-continued

| THERMAL TRANSFER RIBBON (UNIT: WT %) | | | | | | |
|---|---|---|---|---|---|---|
| LAYER DIVISION | COMPOSITION | EXAMPLE 1 | EXAMPLE 2 | EXAMPLE 3 | EXAMPLE 4 | EXAMPLE 5 |
| | B001) | | | | | |
| | Methylethylketone:Toluene (1:1) | 60 | 60 | 60 | 60 | 60 |
| P2 | B-66 | 20 | 20 | 20 | 20 | — |
| | B-60 | — | — | — | — | 20 |
| | Aluminum(SHI NE 412) | — | 20 | — | 20 | — |
| | Copper (Lack K 900) | 20 | — | 20 | — | 20 |
| | Methylethylketone:Toluene (1:1) | 60 | 60 | 60 | 60 | 60 |
| LOWER OVERLAY LAYER (7b) | BR-83 | | | 15 | | |
| | Methylethylketone:Toluene (1:1) | | | 75 | | |
| UPPER OVERLAY LAYER (7a) | BR-83 | | | 15 | | |
| | 321-BG | | | 1 | | |
| | Methylethylketone:Toluene (1:1) | | | 74 | | |
| IMAGE RECEIVING SHEET FOR PHOTO PRINTER | | | | | | |
| SUBSTRATE | Polyurethane 1) | O | O | O | O | O |
| | Foam PET 2) | | | | | |

TABLE 6

| THERMAL TRANSFER RIBBON (UNIT: WT %) | | | | | | |
|---|---|---|---|---|---|---|
| LAYER SEPARATION | COMPOSITION CAPABLE OF IMPROVING DURABILITY OF | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
| P1 | B-66 | — | 20 | 20 | — | 20 |
| | BRH-85 | — | — | — | 20 | — |
| | Aluminum (SDF: 6-2031) | — | — | — | 20 | 20 |
| | Aluminum (Chromal I) | — | 20 | — | — | — |
| | Copper (Lack K 900) | — | — | 20 | — | — |
| | Methylethylketone:Toluene (1:1) | — | 60 | 60 | 60 | 60 |
| P2 | B-66 | — | 20 | 20 | — | 20 |
| | BR-85 | — | — | — | 20 | — |
| | Copper (Lack G 900) | — | — | 20 | — | — |
| | Copper (Lack K 900) | — | 20 | — | 20 | 20 |
| | Methylethylketone:Toluene (1:1) | — | 60 | 60 | 60 | 60 |
| LOWER OVERLAY LAYER (7b) | BR-83 | | | 15 | | |
| | Methylethylketone:Toluene (1:1) | | | 75 | | |
| UPPER OVERLAY LAYER (7A) | BR-83 | | | 15 | | |
| | 321BG | | | 1 | | |
| | Methylethylketone:Toluene (1:1) | | | 74 | | |
| IMAGE RECEIVING SHEET FOR PHOTO PRINTER | | | | | | |
| SUBSTRATE | Polyurethane 1) | O | O | O | O | |
| | Foam PET 2) | | | | | O |

1) Polyurethane: ink receiving layer (~20 μm) + polyurethane (~80 μm) + adhesive layer (~40 μm) + release PET (~100 μm) = ~240 μm 2) Foam PET: ink receiving layer (~5 μm) + FOAM PET (~75 μm) + adhesive layer (~35 μm) + release PET (~125 μm) = ~240 μm

TABLE 7

| ABBREVIATION & PRODUCT NAME | DESCRIPTION | MANUFACTURER |
|---|---|---|
| B-66 | Acrylic resin; Glass transition temperature of 75° C., Molecular weight of 50,000 | DOW |
| B-60 | Acrylic resin; Glass transition temperature of 50° C., Molecular weight of 70,000 | DOW |

TABLE 7-continued

| ABBREVIATION & PRODUCT NAME | DESCRIPTION | MANUFACTURER |
|---|---|---|
| BR-85 | Acrylic resin; Glass transition temperature of 105° C., Molecular weight of 280,000 | MITSUBISHI RAYON |
| BR-83 | Acrylic resin; Glass transition temperature of 105° C., Molecular weight of 40,000 | MITSUBISHI RAYON |
| SDF 6-2031 | Silver-colored pigment; Aluminum, Particle size ~21 μm | ECKART |
| Lack G 900 | Gold-colored pigment; Copper, Particle size ~27 μm | ECKART |
| LUXAN B001 | Pearl-colored pigment; Glass, Particle size ~22 μm | ECKART |
| SHINE 412 | Silver-colored pigment; Aluminum, Particle size ~14 μm | ECKART |
| Lack K 900 | Gold-colored pigment; Copper, Particle size ~10 μm | ECKART |
| Chromal I | Silver-colored pigment; Aluminum, Particle size ~39 μm | ECKART |
| 321 | Wax; Polytetrafluoroethylene series | Shamrock |

Test Examples: Properties of Thermal Transfer Ribbons

In order to test the manufactured thermal transfer ribbons, images for nail art were printed on the image receiving sheets presented in [Table 5] and [Table 6] using a thermal transfer printer. Point expression power (fanciness), resolution, bad printing, and bad transfer of the printed images were observed by naked eyes and a microscope. Adhesion maintenance power and water-resisting properties of the thermal transfer ribbon, which was formed in a fingernail shape, while and after being adhered onto the fingernail were checked, and then, were written on the following [Table 8].

Moreover, the comparative Example 3, in which the pigment particle size of the first point ink part P1 was smaller than that of the second point ink part P2, showed bad resolution/printing.

Furthermore, the comparative Example 4, in which acrylic resin (BR-85) with glass transition temperature of 105° C. and molecular weight of 280,000 is used for the first and second point ink parts, showed bad resolution/printing and bad transfer, and was not good at point expression.

Additionally, the image receiving sheets of the polyurethane substrates according to the embodiments 1 to 5 and the comparative examples 1 to 4 was very flexible when the release sheets (PET) were removed, were adhered onto the nails well, and maintained the adhesive force well even when the user washed the hands or swam in a pool. However, in the case of the comparative example 5 which used the image receiving sheet of a foam PET substrate, it was very difficult to attach onto the nails having curves since the end part frequently came off due to hardness of the foam PET, and was easily peeled off when being in contact with water, for instance, when the user washed the hands, even though the user forcedly pushed the image receiving sheet onto the nail.

TABLE 8

| DIV. | POINT EXPRESSION | RESOLUTION/ BAD PRINTING | BAD TRANSFER | ADHESIVE FORCE | REMARK |
|---|---|---|---|---|---|
| EXAMPLE 1 | ◎ | None | None | None | |
| EXAMPLE 2 | ◎ | None | None | None | |
| EXAMPLE 3 | ◎ | None | None | None | |
| EXAMPLE 4 | ○ | None | None | None | |
| EXAMPLE 5 | ◎ | None | None | None | |
| COMPARATIVE EXAMPLE 1 | X | None | None | None | |
| COMPARATIVE EXAMPLE 2 | Δ | Poor (P1) | Poor (P1) | None | Bad resolution P1 |
| COMPARATIVE EXAMPLE 3 | Δ | Poor (P1) | None | None | Unexpressed P1 |
| COMPARATIVE EXAMPLE 4 | Δ | Very poor (P1 & P2) | Very poor (P1 & P2) | None | Bad printing due to bad transfer |
| COMPARATIVE EXAMPLE 5 | ◎ | None | None | Poor | Bad adhesion on curve & weak maintenance after forced adhesion |

Note)
◎: Excellent and fancy at point expression
○: Good and fancy at point expression
Δ: There is a great difference between the printed matter and the image in point expression
X: There is no point expression As you can see from the results of Table 8, the embodiments 1 to 5 of the present invention had no problem in fancy point expression, and showed excellent printing properties without bad resolution/printing and bad transfer, and also showed excellent adhesive force when being adhered on the nail.

On the other hand, the comparative Example 1, which does not include the first point ink part P1 and the second point ink part P2, could not express fancy points.

The comparative Example 2, in which the silver-colored pigment (Chromal I) with the particle size of up to 39 μm was used to the first point ink part, showed bad resolution/printing and bad transfer.

Figure 4:
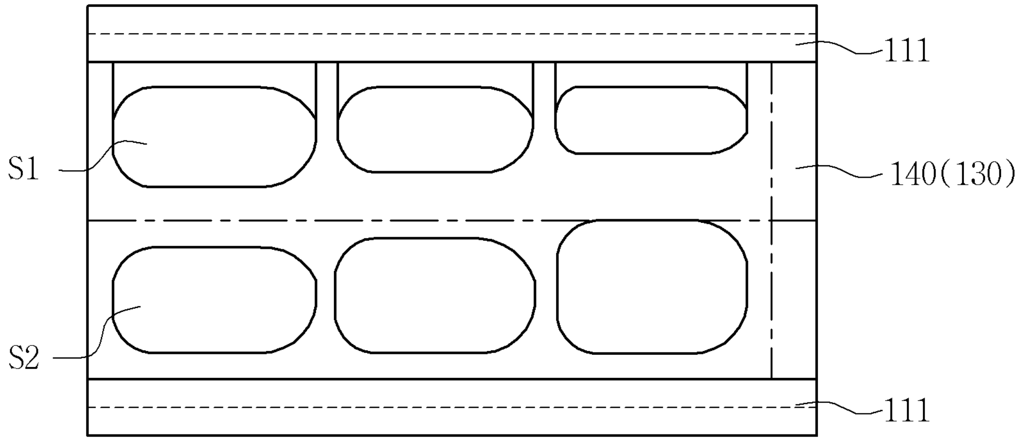
FIG. 4 is a view illustrating a printing sheet for nail decoration according to the present invention.

Referring to FIG. 4, the printing sheet according to the present invention has a cutting line formed on a substrate 130 attached onto the release paper so that the user can easily separate the nail sticker S1 and the toenail sticker S2.

INDUSTRIAL APPLICABILITY

According to the embodiments of the present invention, users can express ornaments of the surface of a sticker easily and conveniently using thermal transfer printing.

What is claimed is:

1. A thermal transfer ribbon comprising:

a color ink part having a yellow ink part (Y), a magenta ink part (M), and a cyan ink part (C);

an overlay part forming an overlay layer to protect a printed surface; and a plurality of point ink parts provided between the color ink part and the overlay part, wherein the color ink part is formed by sublimation ink, and the plurality of point ink parts are formed by molten ink, wherein the plurality of point ink parts are formed between the color ink part and the overlay part, and wherein a particle size of the plurality of point ink parts close to the color ink part is larger than that of the point ink parts close to the overlay part.

2. The thermal transfer ribbon according to claim 1, wherein the plurality of point ink parts include at least one of pearl, fluorescent, luminous, sparkling, glass, and metal pigments.

3. A thermal transfer ribbon comprising:

a color ink part having a yellow ink part (Y), a magenta ink part (M), and a cyan ink part (C);

an overlay part forming an overlay layer to protect a printed surface; and a plurality of point ink parts provided between the color ink part and the overlay part, wherein the color ink part is formed by sublimation ink, and the plurality of point ink parts are formed by molten ink, and wherein the plurality of point ink parts include a binder resin, and the binder resin has glass transition temperature (Tg) of 80° C. or lower and molecular weight (Mw) of 100,000 g/mol or less.

4. The thermal transfer ribbon according to claim 1, comprising:

a substrate layer having one side on which the color ink part, the overlay part, and the plurality of point ink parts are coated; and a heat-resistant layer coated on a rear side of the substrate layer, wherein the thickness of the substrate layer is 4.0 μm to 6.0 μm, wherein the thickness of the heat-resistant layer is 0.1 μm to 2 μm, and wherein the thickness of the color ink part or each of the plurality of point ink pats is 0.3 μm to 15 μm.

5. A sticker printing method using the thermal transfer ribbon according to claim 1, the sticker printing method comprising the steps of:

1) forming an image on a printing sheet in a state in which h yellow ink part (Y) is positioned on a lower part of a thermal transfer head;

2) forming an image on the printing sheet in a state in which h magenta ink part (M) is positioned on the lower part of the thermal transfer head;

3) forming an image on the printing sheet in a state in which h cyan ink part (C) is positioned on the lower part of the thermal transfer head;

4) forming a point on the printing sheet in a state in which the plurality of point ink parts are positioned on the lower part of the thermal transfer head; and 5) forming the overlay layer on a printed surface of the printing sheet in a state in which the overlay part is positioned on the lower part of the thermal transfer head.

6. The method according to claim 5, wherein the steps 1) to 3) are to form an image with the sublimation ink, and the step 4) is to form the point with the molten ink.

7. The method according to claim 5, wherein the point includes at least one of pearl, fluorescent, luminous, sparkling, glass, and metal.

* * * * *